US012736086B2

(12) United States Patent
Uematsu et al.

(10) Patent No.: US 12,736,086 B2
(45) Date of Patent: Sep. 15, 2026

(54) ROLLER BEARING

(71) Applicant: NSK LTD., Tokyo (JP)

(72) Inventors: Shunichi Uematsu, Kanagawa (JP); Sadayuki Tanaka, Kanagawa (JP); Naoki Maekawa, Kanagawa (JP); Masateru Kondo, Kanagawa (JP)

(73) Assignee: NSK LTD., Tokyo (JP)

( * ) Notice: Subject to any disclaimer, the term of this patent is extended or adjusted under 35 U.S.C. 154(b) by 74 days.

(21) Appl. No.: 18/858,156

(22) PCT Filed: Apr. 14, 2023

(86) PCT No.: PCT/JP2023/015240

§ 371 (c)(1),
(2) Date: Oct. 18, 2024

(87) PCT Pub. No.: WO2023/204161

PCT Pub. Date: Oct. 26, 2023

(65) Prior Publication Data

US 2025/0271029 A1 Aug. 28, 2025

(30) Foreign Application Priority Data

Apr. 20, 2022 (JP) ................................ 2022-069472
Sep. 14, 2022 (JP) ................................ 2022-146395
Feb. 13, 2023 (JP) ................................ 2023-020158

(51) Int. Cl.
*F16C 33/60* (2006.01)

(52) U.S. Cl.
CPC .................................. *F16C 33/605* (2013.01)

(58) Field of Classification Search
CPC . F16C 33/605; F16C 2226/52; F16C 2226/60
See application file for complete search history.

(56) References Cited

U.S. PATENT DOCUMENTS 1,956,289 A * 4/1934 Herrmann ............... F16C 25/06 384/571
2008/0226214 A1 9/2008 Glas et al.

FOREIGN PATENT DOCUMENTS

EP 2 166 238 B1 2/2013
JP 39-12218 Y1 5/1964
JP 2006-207731 A 8/2006
JP 2009-510376 A 3/2009
JP 2013-15200 A 1/2013

(Continued)

OTHER PUBLICATIONS

Extended European Search Report dated Aug. 18, 2025, issued by the European Patent Office in European Application 23791809.9.

(Continued)

*Primary Examiner* — James Pilkington
(74) *Attorney, Agent, or Firm* — Sughrue Mion, PLLC

(57) ABSTRACT

A flange integrated with an inner ring is formed at one end of the inner ring in an axial direction, and a flange member separate from the inner ring is fastened to a fastening member extending in the axial direction at the other end of the inner ring in the axial direction, and the flange member includes a base abutting against the inner ring in the axial direction and on which a head of the fastening member is seated, and a caulking portion pressing the head of the fastening member from the other end side in the axial direction.

4 Claims, 11 Drawing Sheets

(56) References Cited

FOREIGN PATENT DOCUMENTS

| | | | |
|---|---|---|---|
| JP | 2013-15201 | A | 1/2013 |
| JP | 2014-190352 | A | 10/2014 |
| JP | 2023-72404 | A | 5/2023 |

OTHER PUBLICATIONS

International Search Report (PCT/ISA/210) issued on Jul. 4, 2023 by the International Searching Authority in International Application No. PCT/JP2023/015240.

Written Opinion (PCT/ISA/237) issued on Jul. 4, 2023 by the International Searching Authority in International Application No. PCT/JP2023/015240.

* cited by examiner 1
42
17
53
50
51
55
60
15
11a
21
11
20
40
43
41
13
30
10

ROLLER BEARING

CROSS-REFERENCE TO RELATED APPLICATIONS

This application is a National Phase Entry of PCT International Application No. PCT/JP2023/015240 filed on Apr. 14, 2023, which claims priority to Japanese Patent Application No. 2022-069472 filed on Apr. 20, 2022, Japanese Patent Application No. 2022-146395 filed on Sep. 14, 2022, and Japanese Patent Application No. 2023-020158 filed on Feb. 13, 2023, the contents of all of which are incorporated herein by reference in their entirety.

TECHNICAL FIELD

The present invention relates to a roller bearing.

BACKGROUND ART

In recent years, not only functions and prices but also life cycle costs are important in industrial machines. For this reason, there is an increasing demand for repair and reuse for roller bearings to be assembled to industrial machines, and a detachable bearing structure is required for inspection.

A conical roller bearing described in Patent Literature 1 includes an inner ring having an inner ring raceway surface, an outer ring having an outer ring raceway surface, a plurality of conical rollers serving as rolling bodies that roll between the inner ring raceway surface and the outer ring raceway surface, and a cage for retaining the conical rollers at an equal interval in a circumferential direction. A large flange is formed integrally with a large-diameter side end of the inner ring, and a small flange member which is a separate body and prevents the conical rollers from falling off is provided at a small-diameter side end of the inner ring. The small flange member is locked to the inner ring by bolts. Accordingly, when the inside of the conical roller bearing is inspected or the cage is replaced, the conical roller bearing can be disassembled by removing the small flange member.

CITATION LIST

Patent Literature

Patent Literature 1: JP2014-190352A

SUMMARY OF INVENTION

Technical Problem

However, in the conical roller bearing of Patent Literature 1, when the bolts are not fastened with an appropriate fastening force or the like, bolt loosening may occur, and the bolts may fall off from the bearing. When the bolts fall off, the bolts may flow into a peripheral driving component (for example, a reduction gear), which may damage the component.

The present invention has been made in view of the above circumstances, and an object thereof is to provide a roller bearing capable of preventing a fastening member for fastening a flange member to an inner ring from falling off.

Solution to Problem

The above object of the present invention is achieved by the following configuration.

(1) A roller bearing, including:

an inner ring including an outer peripheral surface having an inner ring raceway surface;

an outer ring including an inner peripheral surface having an outer ring raceway surface; and a plurality of rollers disposed such that the rollers are capable of rolling between the inner ring raceway surface and the outer ring raceway surface, in which a flange integrated with the inner ring is formed at one end of the inner ring in an axial direction, a flange member separate from the inner ring is fastened to a fastening member extending in the axial direction at the other end of the inner ring in the axial direction, and the flange member includes a base abutting against the inner ring in the axial direction and on which a head of the fastening member is seated, and a caulking portion pressing the head of the fastening member from the other end side in the axial direction.

Advantageous Effects of Invention

According to the present invention, it is possible to provide a roller bearing capable of preventing a fastening member for fastening a flange member to an inner ring from falling off.

BRIEF DESCRIPTION OF DRAWINGS

FIG. 2 is a sectional view of a main part of the conical roller bearing in FIG. 1.

FIG. 7 is a sectional view of a main part of the conical roller bearing in FIG. 6.

FIG. 10 is a sectional view of a main part of the conical roller bearing before a caulking portion is formed.

FIG. 11 is a sectional view of a main part of a conical roller bearing according to a first modification of the second embodiment.

DESCRIPTION OF EMBODIMENTS

First Embodiment

Figure 1:
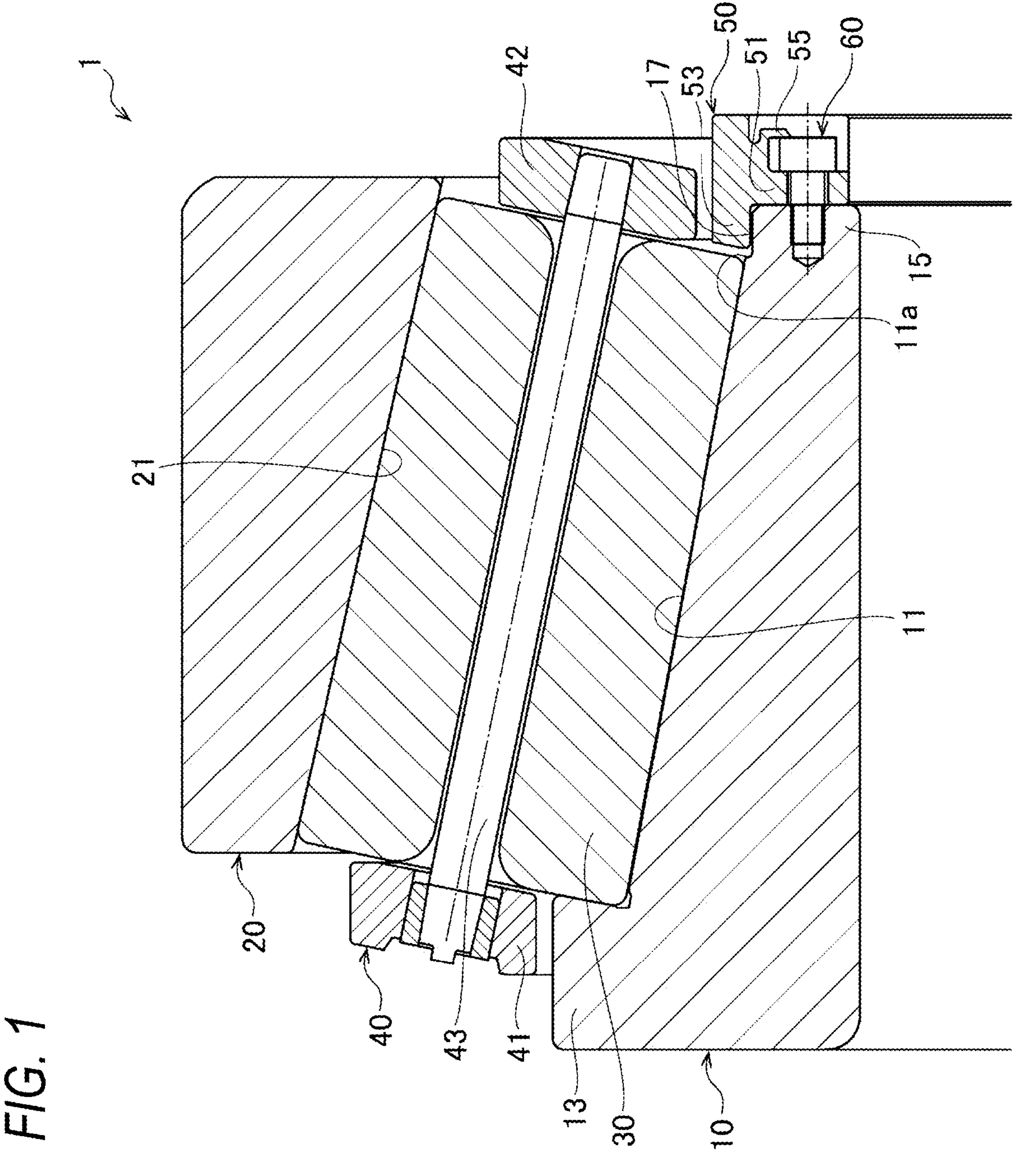
FIG. 1 is a sectional view of a conical roller bearing according to a first embodiment of the present invention.
Figure 2:
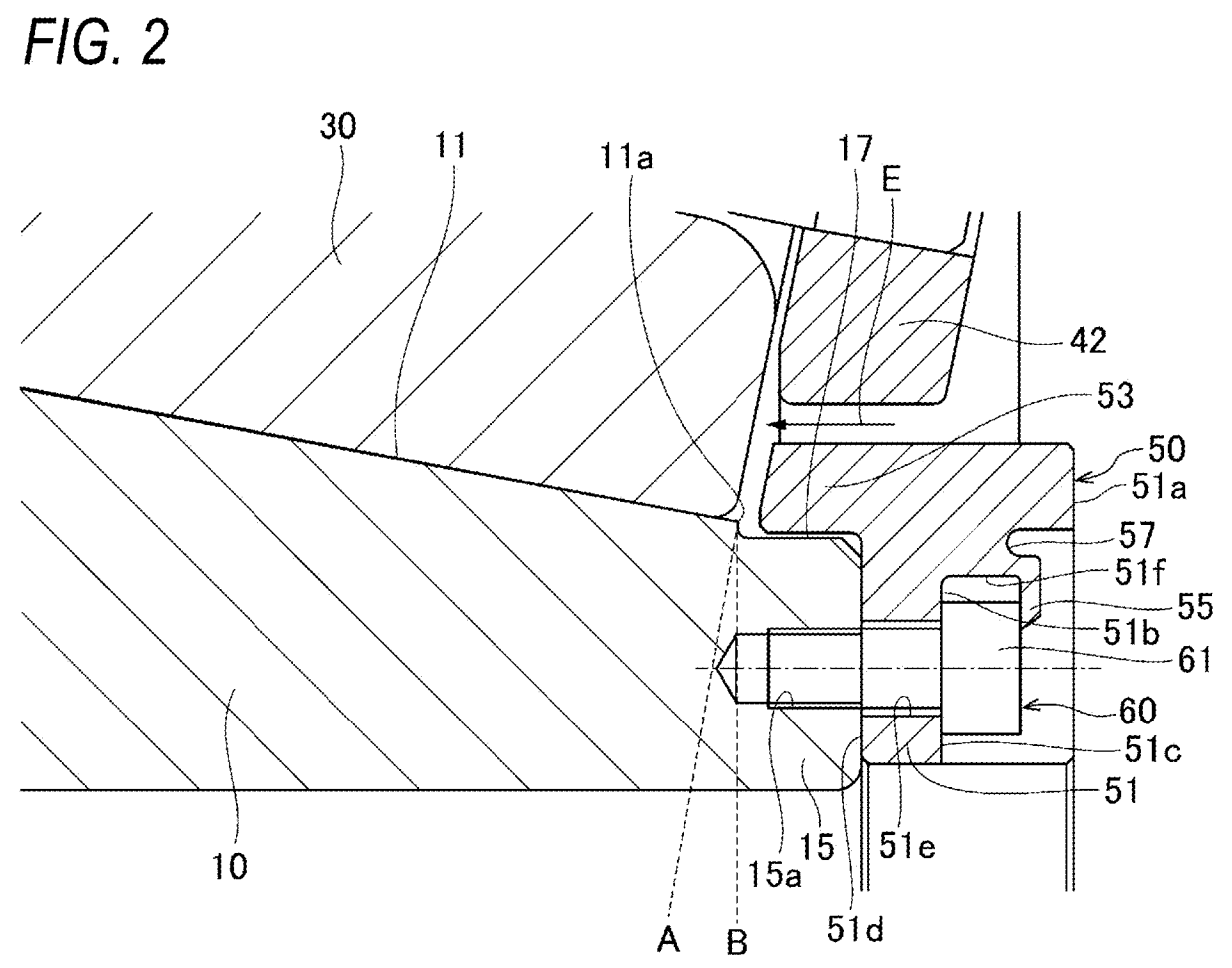

FIG. 1 is a sectional view of a conical roller bearing 1 according to a first embodiment of the present invention. FIG. 2 is a sectional view of a main part of the conical roller bearing 1 in FIG. 1.

The conical roller bearing 1 includes an inner ring 10 including an outer peripheral surface having a conical inner ring raceway surface 11, an outer ring 20 including an inner peripheral surface having a conical outer ring raceway surface 21, and a plurality of conical rollers 30 disposed such that the conical rollers are capable of rolling between the inner ring raceway surface 11 and the outer ring raceway surface 21.

The conical rollers 30 are held at a constant interval in a circumferential direction by an annular cage 40 incorporated between the inner ring raceway surface 11 and the outer ring raceway surface 21. The cage 40 is a pin-type cage and includes a pair of annular portions 41 and 42 and a pin 43 for fastening the pair of annular portions 41 and 42.

Note that the type of the cage 40 is not limited, and for example, a press cage (basket cage) made of a steel plate may be used, which includes a large-diameter ring, a small-diameter ring, a plurality of pillars that couple the large-diameter ring and the small-diameter ring in an axial direction, and a pocket that is defined between the large-diameter ring and the pillars adjacent to the small-diameter ring.

One end of the inner ring 10 in an axial direction (the left end in the drawing, a large-diameter side end) is formed with a flange 13 integrated with the inner ring 10. The flange 13 protrudes from the inner ring raceway surface 11 toward a radially outer side, and prevents the conical rollers 30 from falling off to one end side in the axial direction. The flange 13 constitutes a large flange of the inner ring 10.

The other end of the inner ring 10 in the axial direction (the right end in the drawing, a small-diameter side end) is formed with an inner ring boss 15 protruding from the inner ring raceway surface 11 toward the other end side in the axial direction. Note that FIG. 2 shows a virtual plane A perpendicular to the inner ring raceway surface 11 extending from the other end 11*a* of the inner ring raceway surface 11 in the axial direction, and a virtual plane B extending in a radial direction from the other end 11*a* in the axial direction. The inner ring boss 15 protrudes from the virtual planes A and B toward the other end side in the axial direction. The inner ring boss 15 is a projection protruding from a position separated from the other end 11*a* of the inner ring raceway surface 11 in the axial direction to a radially inner side toward the other end side in the axial direction, and therefore, a stepped portion 17 is formed between the inner ring boss 15 and the other end 11*a* of the inner ring raceway surface 11 in the axial direction.

A flange member 50 made of a steel material or a resin material, which is separate from the inner ring 10, is fastened to the inner ring boss 15 by a bolt 60. Note that although the bolt 60 in the present embodiment is a hexagon socket head bolt, the type of the bolt is not particularly limited, and it is needless to say that other types of fastening members such as screws may be used. Since the fastening member such as the bolt 60 extend in the axial direction and fasten the inner ring boss 15 and the flange member 50 in the axial direction, the bolts can be easily fastened regardless of the form of the cage. Since the attachment and detachment of the flange member 50 can be easily performed, assembly work of the conical roller bearing 1 becomes easy, and inspection of the inside of the conical roller bearing 1 and replacement of the conical rollers 30 or the cage 40 become easy.

A threaded hole 15*a* directed in the axial direction is formed in the inner ring boss 15. A female thread portion of the threaded hole 15*a* is preferably formed so as not to overlap the virtual plane A in the axial direction, and more specifically, the female thread portion of the threaded hole 15*a* is preferably disposed on the other end side in the axial direction with respect to the virtual plane A. In this case, the bolt 60 screwed into the female thread portion of the threaded hole 15*a* is also disposed so as not to overlap the virtual plane A in the axial direction, and more specifically, is disposed on the other end side in the axial direction with respect to the virtual plane A.

More preferably, the female thread portion of the threaded hole 15*a* of the inner ring boss 15 is formed so as not to overlap the other end 11*a* (virtual plane B) of the inner ring raceway surface 11 in the axial direction, and more specifically, is disposed on the other end side in the axial direction of the other end 11*a* (virtual plane B) of the inner ring raceway surface 11 in the axial direction. In this case, the bolt 60 screwed into the female thread portion of the threaded hole 15*a* is also disposed so as not to overlap the other end 11*a* (virtual plane B) of the inner ring raceway surface 11 in the axial direction, and more specifically, is disposed on the other end side in the axial direction of the other end 11*a* (virtual plane B) of the inner ring raceway surface 11 in the axial direction.

When the bolt 60 is disposed so as not to overlap the inner ring raceway surface 11 in the axial direction in this manner, a bolt fastening portion is prevented from being disposed directly below the inner ring raceway surface 11 in the radial direction. Accordingly, even when a large load is applied on a raceway surface during use of the bearing, generation of a high stress on the bolt fastening portion can be prevented.

However, the above description does not exclude a mode in which the bolt fastening portion overlaps the virtual planes A and B in the axial direction.

The flange member 50 may be configured by an annular member, or may be configured by arranging a plurality of circular ring pieces forming a part of a circular ring at intervals in the circumferential direction. The flange member 50 includes an annular base 51 extending to a radially outer side of the inner ring boss 15, and a projection 53 protruding from an end on the radially outer side of the base 51 toward one side in the axial direction (a direction of an arrow E in FIG. 2, a direction approaching the inner ring 10 and the conical rollers 30). The base 51 abuts against the inner ring boss 15 in the axial direction. The projection 53 enters the stepped portion 17 of the inner ring 10.

Figure 3:
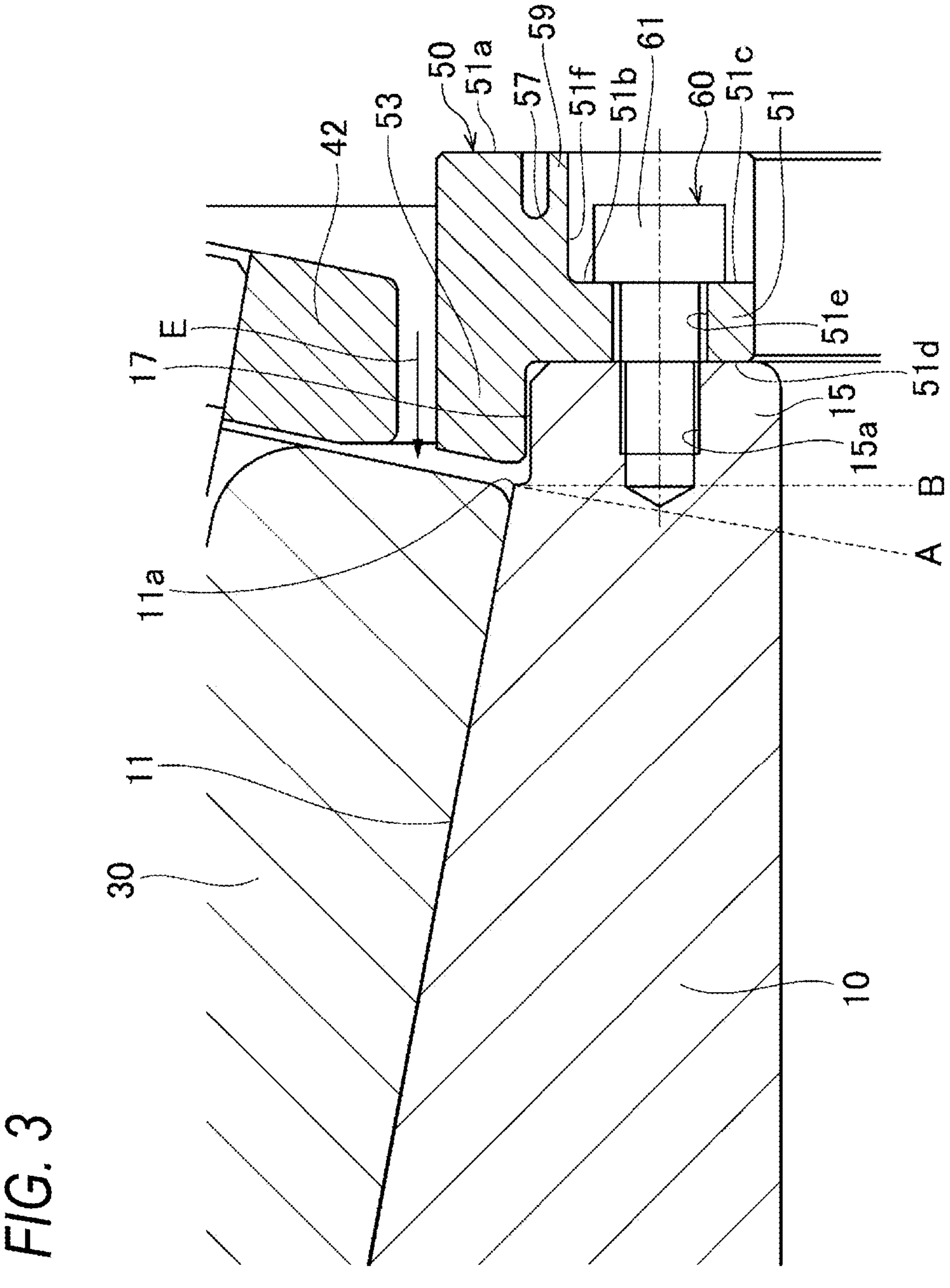
FIG. 3 is a sectional view of a main part of the conical roller bearing before a caulking portion is formed.
Figure 4:
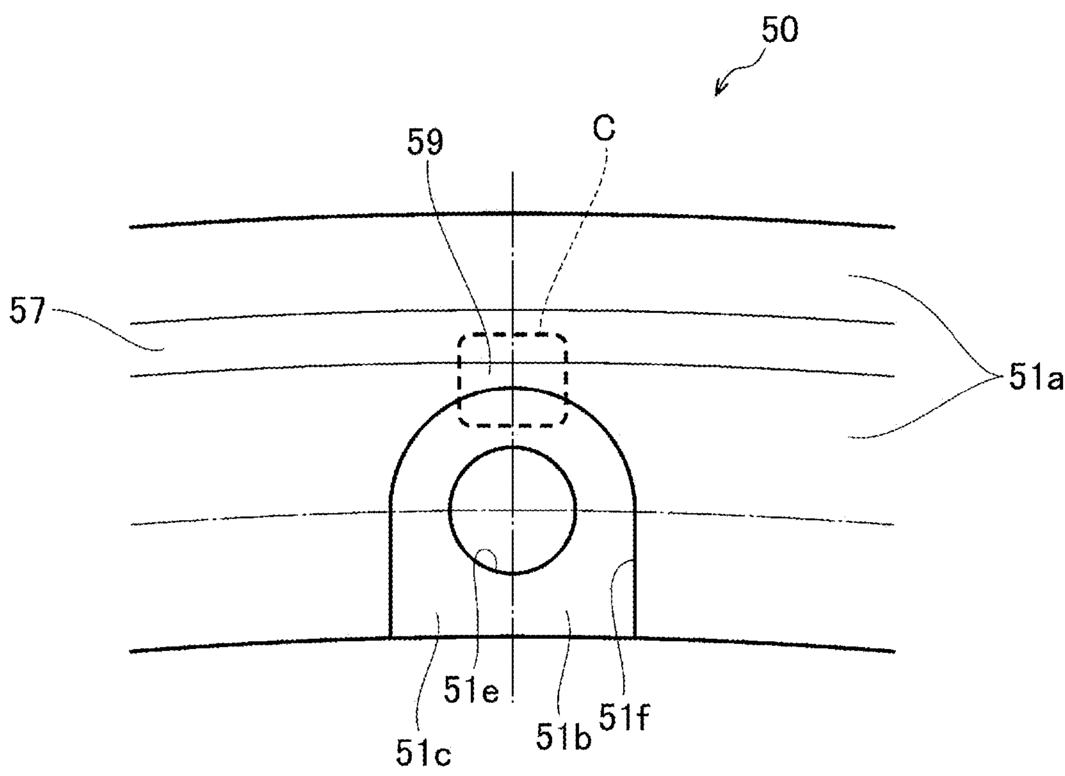
FIG. 4 is a view of a flange member before the caulking portion is formed, as viewed from the other end side in an axial direction.

FIG. 3 is a sectional view of a main part of the conical roller bearing 1 before a caulking portion 55, which will be described later, is formed. FIG. 4 is a view of the flange member 50 before the caulking portion 55, which will be described later, is formed, as viewed from the other end side in the axial direction (the right side in FIGS. 1 to 3).

As shown in FIGS. 2 to 4, the base 51 includes a recess 51*b* recessed from the other end surface 51*a* in the axial direction toward one side in the axial direction. The recess 51*b* functions as a seating portion on which a head 61 of the bolt 60 is seated. As shown in FIG. 4, an edge (peripheral wall) 51*f* of the recess 51*b* in the present embodiment has an inverted U shape as viewed in the axial direction, and opens to a radially inner side, but the shape of the recess 51*b* is not particularly limited.

A through hole 51*e* penetrating from a bottom surface 51*c* (the other end surface in the axial direction) of the recess 51*b* to one end surface 51*d* of the base 51 in the axial direction is formed in the base 51. The through hole 51*e* is provided at a position facing the threaded hole 15*a* of the inner ring boss 15 in the axial direction. Accordingly, as in the illustrated embodiment, the through holes 51*e* and the recesses 51*b* in which the through holes 51*e* are respectively formed are provided in the same number as the threaded holes 15*a*.

The bolt 60 passes through the through hole 51*e* of the base 51 and is screwed into the threaded hole 15*a* of the inner ring boss 15 to extend in the axial direction, thereby fastening the inner ring boss 15 and the flange member 50 in the axial direction. In this case, the head 61 of the bolt 60 is seated on the recess 51*b* of the base 51.

The projection 53 of the flange member 50 fastened to the inner ring boss 15 is positioned on the radially outer side of the other end 11*a* in the axial direction of the inner ring raceway surface 11 and faces the conical rollers 30 in the axial direction, so as to prevent the conical rollers 30 from falling off to the other end side in the axial direction. In this way, the flange member 50 constitutes a small flange of the inner ring 10.

Here, as shown in FIG. 2, the flange member 50 includes the caulking portion 55 that presses the head 61 of the bolt 60 from the other end side in the axial direction. The caulking portion 55 extends from at least a part of the edge 51*f* of the recess 51*b* so as to overlap the head 61 of the bolt 60. The caulking portion 55 in the embodiment shown in FIG. 2 extends from a radially outer side portion of the edge 51*f* of the recess 51*b* to the radially inner side and presses a radially outer side portion of the head 61 of the bolt 60 from the other end side in the axial direction. The caulking portion 55 is formed by plastically deforming a thin wall 59 shown in FIGS. 3 to 4 with a tool or the like.

As shown in FIG. 2, the base 51 of the flange member 50 is formed with a groove 57 recessed from the other end surface 51*a* in the axial direction toward one side in the axial direction on a side opposite to the head 61 of the bolt 60 and the recess 51*b* with the caulking portion 55 interposed therebetween (on a radially outer side of the caulking portion 55 in the illustrated embodiment). That is, the groove 57 in the present embodiment is recessed at a position separated from the recess 51*b* on the radially outer side of the recess 51*b*. As shown in FIG. 4, the groove 57 in the present embodiment is formed over the whole circumference of the base 51.

Accordingly, as shown in FIGS. 3 and 4, the thin wall 59 is provided between the recess 51*b* and the groove 57 in a state before the caulking portion 55 is formed. In the thin wall 59, for example, a region surrounded by a broken line C in FIG. 4 is plastically deformed to the radially inner side by a tool such as a punch to obtain the caulking portion 55 as shown in FIG. 2. The caulking portion 55 prevents the bolt 60 from falling off even when the bolt 60 is loosened.

Note that the groove 57 is not necessarily formed over the whole circumference of the base 51, and the position thereof is not limited as long as it is formed on the side opposite to the recess 51*b* with the caulking portion 55 (thin wall 59) interposed therebetween. For example, the groove 57 may be intermittently provided only on the radially outer side of the recess 51*b* so as to be separated from the recess 51*b*. The groove 57 may be provided on at least one of both sides in the circumferential direction of the recess 51*b*. In either case, since the thin wall 59 is provided between the groove 57 and the recess 51*b*, by plastically deforming the thin wall 59, it is possible to form the caulking portion 55 which extends from at least a part of the edge 51*f* of the recess 51*b* and overlaps the head 61 of the bolt 60.

Modification of First Embodiment

Figure 5:
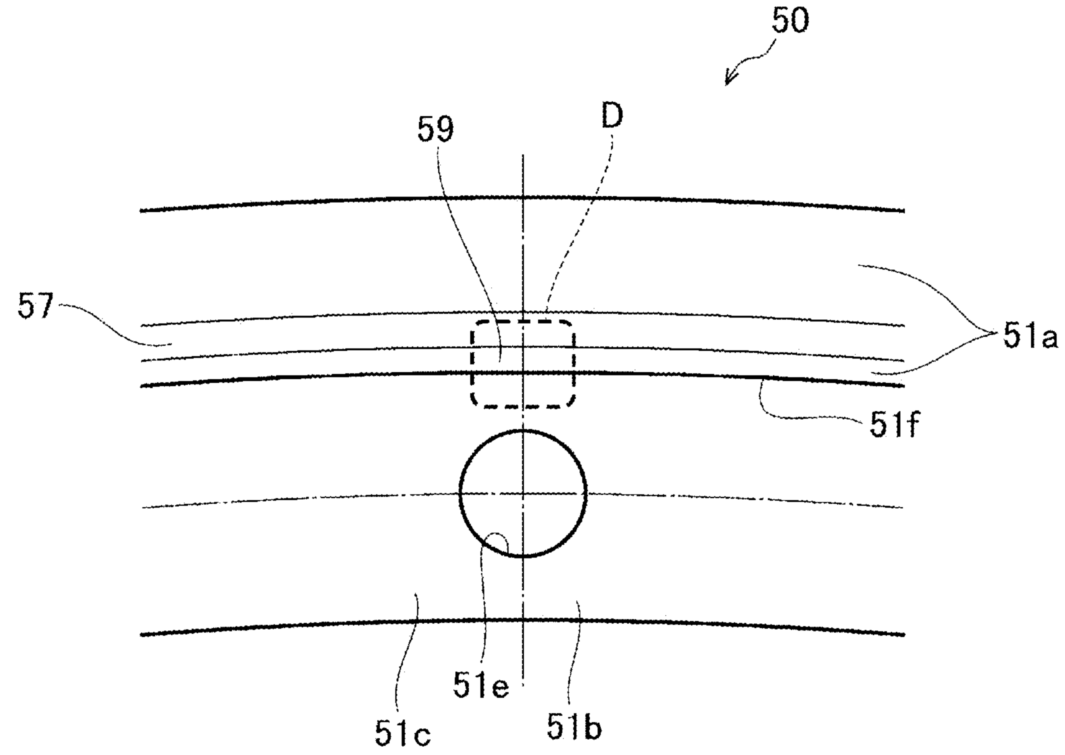
FIG. 5 is a view of a flange member according to a modification before a caulking portion is formed, as viewed from the other end side in an axial direction.

FIG. 5 is a view of the flange member 50 according to a modification before the caulking portion 55 is formed, as viewed from the other end side in the axial direction. As shown in FIG. 5, in the flange member 50 of the present modification, a recess 51*b* is formed over the whole circumference of the base 51. The groove 57 is formed over the whole circumference of the base 51 in a manner of being separated from the recess 51*b* toward the radially outer side. In this modification, the thin wall 59 is also provided between the recess 51*b* and the groove 57 over the whole circumference of the base 51. In the thin wall 59, for example, a region surrounded by a broken line D in FIG. 5 is plastically deformed to the radially inner side by a tool such as a punch to obtain the caulking portion 55 as shown in FIG. 2. Even when the bolt 60 is loosened, the head of the bolt abuts against the caulking portion, so that the bolt is prevented from falling off in the axial direction by the caulking portion 55.

Second Embodiment

Next, the conical roller bearing 1 according to a second embodiment will be described. The conical roller bearing 1 of the present embodiment is the same as that of the first embodiment except for the flange member 50, and therefore, same configurations are designated by same reference numerals in the drawings and descriptions thereof are omitted or simplified.

Figure 6:
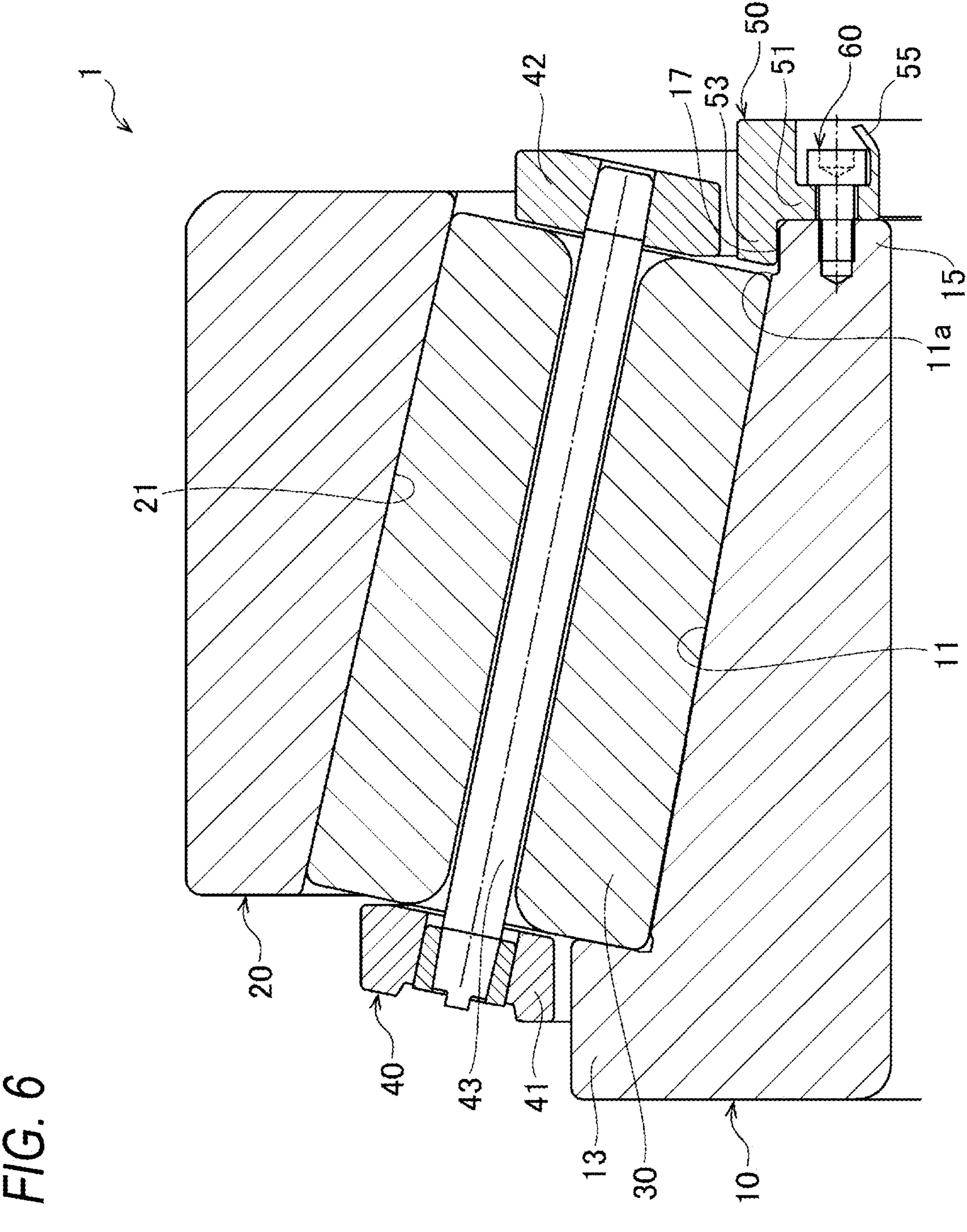
FIG. 6 is a sectional view of a conical roller bearing according to a second embodiment of the present invention.
Figure 7:
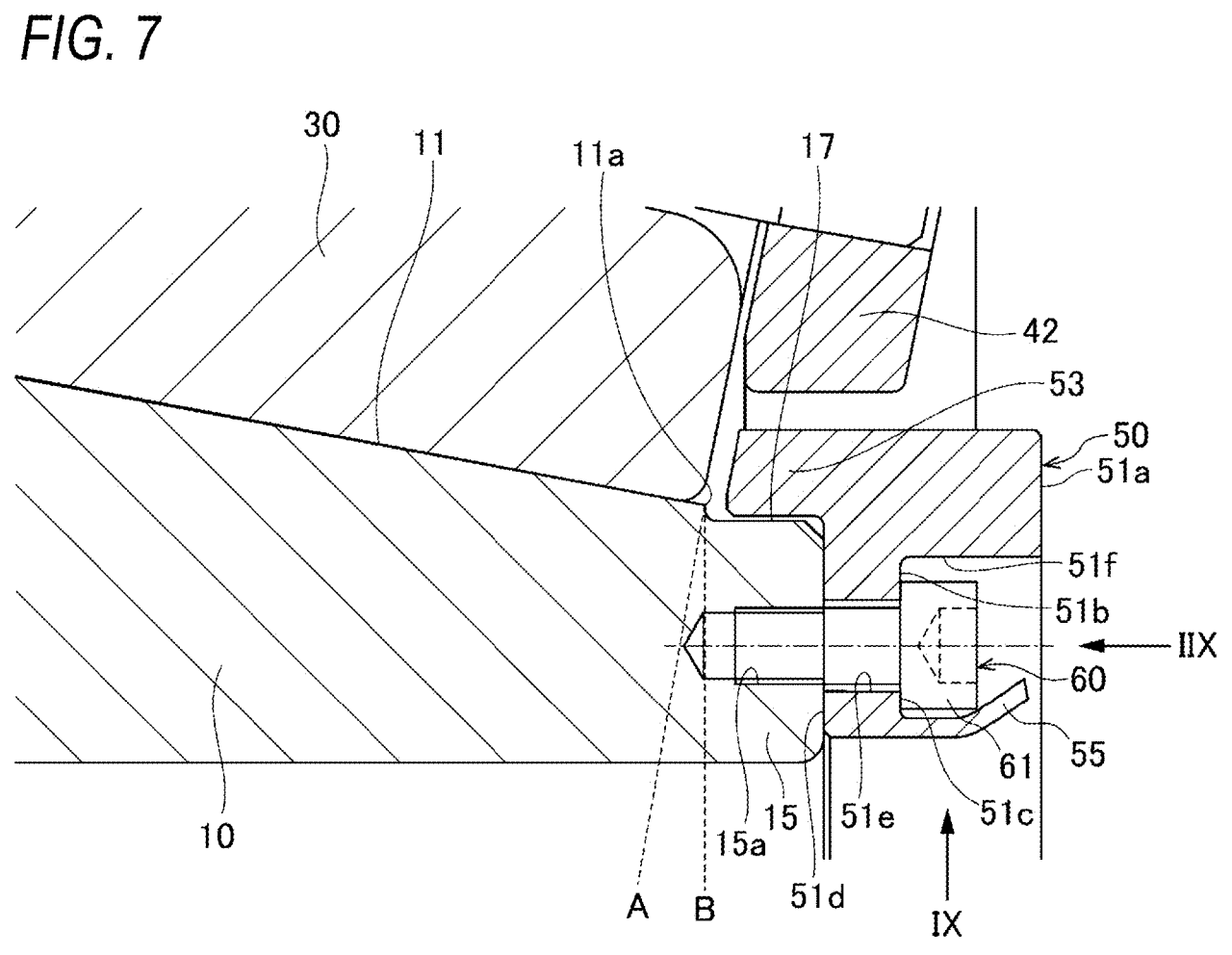
Figure 8:
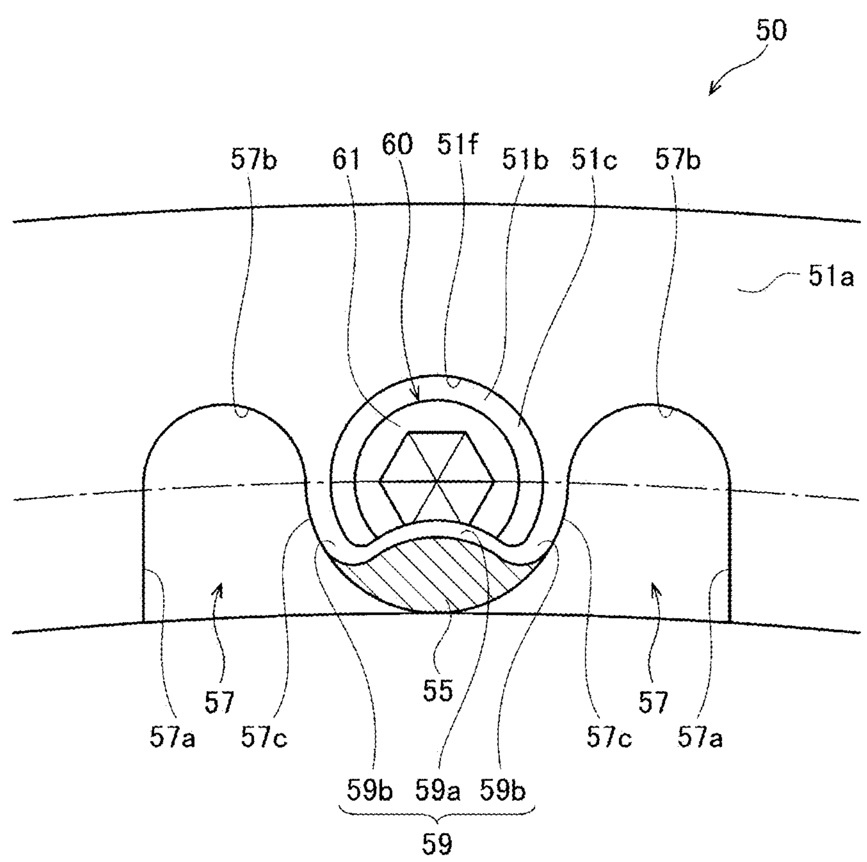
FIG. 8 is a view of a flange member in FIG. 7 as viewed in a direction of an arrow IIX.
Figure 9:
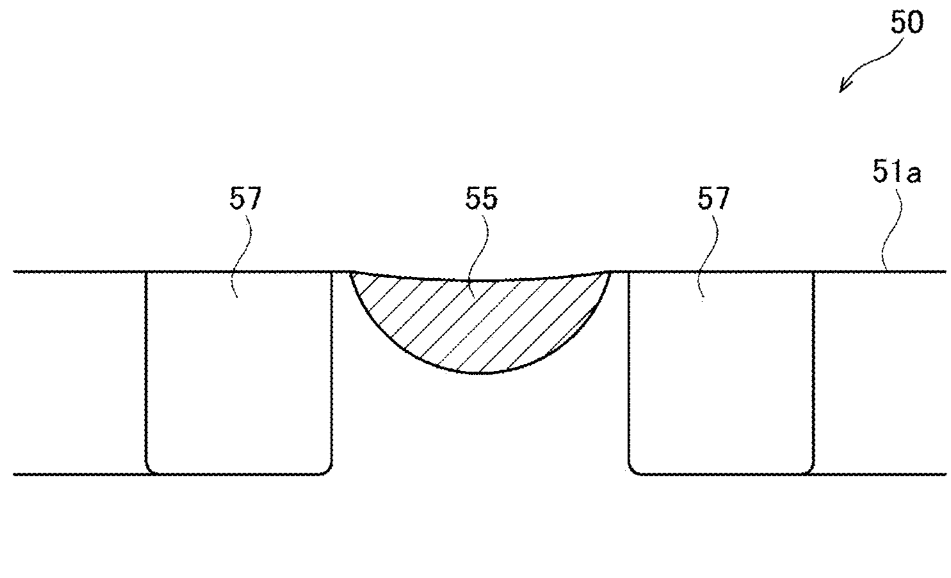
FIG. 9 is a view of the flange member in FIG. 7 as viewed in a direction of an arrow IX.
Figure 10:
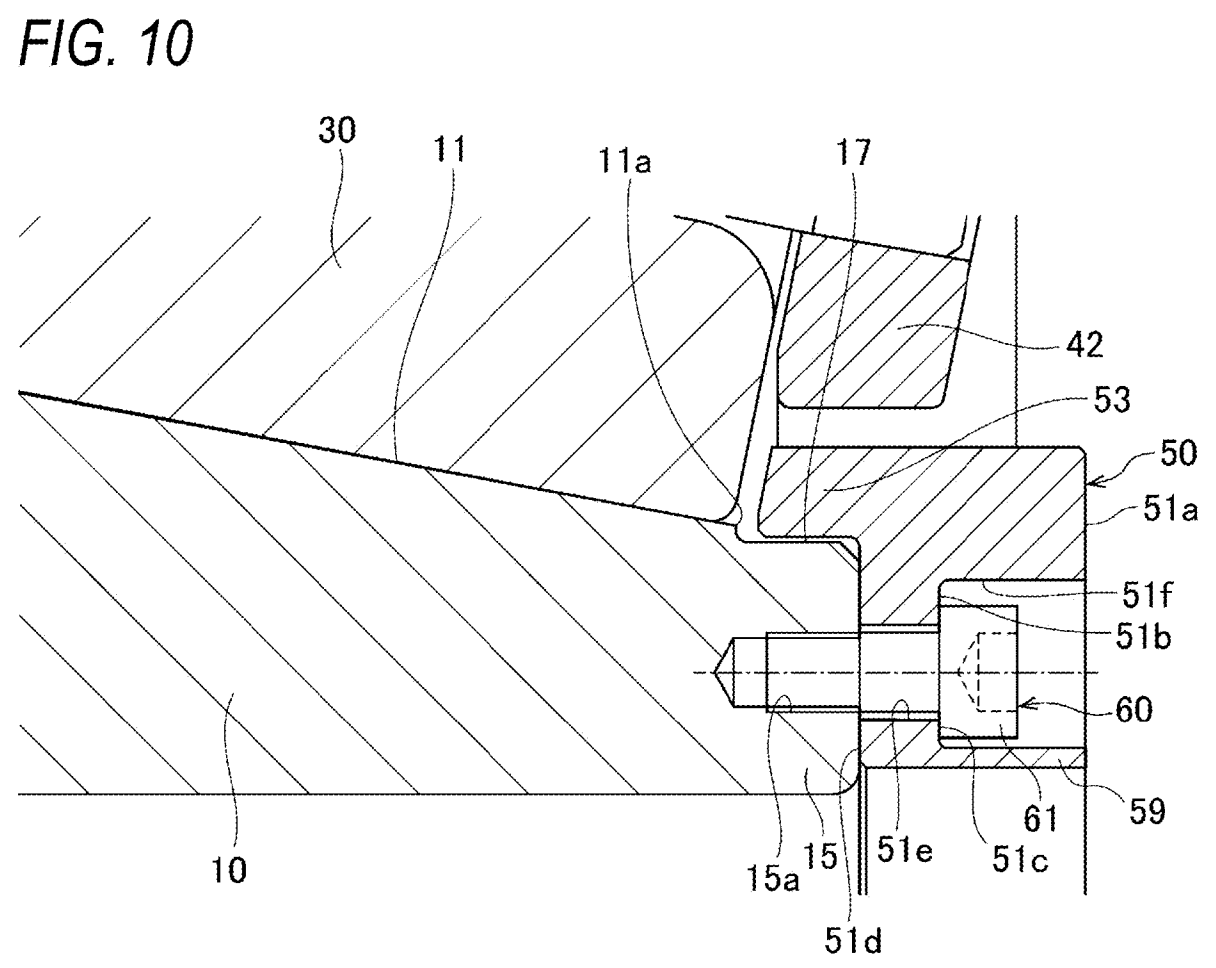

FIG. 6 is a sectional view of the conical roller bearing 1 according to the second embodiment of the present invention. FIG. 7 is a sectional view of a main part of the conical roller bearing 1 in FIG. 6. FIG. 8 is a view of the flange member 50 in FIG. 7 as viewed in a direction of an arrow IIX. FIG. 9 is a view of the flange member 50 in FIG. 7 as viewed in a direction of an arrow IX. FIG. 10 is a sectional view of a main part of the conical roller bearing 1 before the caulking portion 55 is formed.

As shown in FIGS. 7 to 9, the base 51 includes a recess 51*b* recessed from the other end surface 51*a* in the axial direction toward one side in the axial direction. The recess 51*b* functions as a seating portion on which the head 61 of the bolt 60 is seated. As shown in FIG. 8, the edge (peripheral wall) 51*f* of the recess 51*b* in the present embodiment has a circular shape as viewed in the axial direction, and has a shape closed in both the radial direction (the upper-lower direction in FIGS. 7 and 8) and the circumferential direction (the left-right direction in FIG. 8).

The through hole 51*e* penetrating from the bottom surface 51*c* (the other end surface in the axial direction) of the recess 51*b* to one end surface 51*d* of the base 51 in the axial direction is formed in the base 51. The through hole 51*e* is provided at a position facing the threaded hole 15*a* of the inner ring boss 15 in the axial direction. Accordingly, as in the illustrated embodiment, the through holes 51*e* and the recesses 51*b* in which the through holes 51*e* are respectively formed are provided in the same number as the threaded holes 15*a*.

The bolt 60 passes through the through hole 51*e* of the base 51 and is screwed into the threaded hole 15*a* of the inner ring boss 15 to extend in the axial direction, thereby fastening the inner ring boss 15 and the flange member 50 in the axial direction. In this case, the head 61 of the bolt 60 is seated on the recess 51*b* of the base 51.

The projection 53 of the flange member 50 fastened to the inner ring boss 15 is positioned on the radially outer side of the other end 11*a* in the axial direction of the inner ring raceway surface 11 and faces the conical rollers 30 in the axial direction, so as to prevent the conical rollers 30 from falling off to the other end side in the axial direction. In this way, the flange member 50 constitutes a small flange of the inner ring 10.

Here, as shown in FIGS. 6 to 9, the flange member 50 includes the caulking portion 55 that presses the head 61 of the bolt 60 from the other end side in the axial direction. In FIGS. 8 and 9, the caulking portion 55 is indicated by a hatched region. The caulking portion 55 extends from at least a part of the edge 51*f* of the recess 51*b* so as to overlap the head 61 of the bolt 60. The caulking portion 55 in the present embodiment extends from a radially inner side portion of the edge 51*f* of the recess 51*b* to the radially outer side and presses a radially inner side portion of the head 61 of the bolt 60 from the other end side in the axial direction. The caulking portion 55 is formed by plastically deforming the thin wall 59 shown in FIGS. 8 and 10 with a tool such as a punch.

As shown in FIGS. 8 and 9, the base 51 of the flange member 50 is formed with a pair of grooves 57 recessed from the other end surface 51*a* in the axial direction toward one side in the axial direction on a side opposite to the head 61 of the bolt 60 and the recess 51*b* with the caulking portion 55 interposed therebetween (on a radially inner side and both sides in the circumferential direction of the caulking portion 55 in the illustrated embodiment). That is, the pair of grooves 57 in the present embodiment are recessed at positions separated from the recess 51*b* on both sides of the recess 51*b* in the circumferential direction. Note that a part of the grooves 57 is also provided on the radially inner side of the recess 51*b*. The depth (width in the axial direction) of the illustrated grooves 57 is substantially the same as the depth (width in the axial direction) of the recess 51*b*, but is not particularly limited thereto.

As shown in FIGS. 8 and 9, the grooves 57 of the present embodiment are open toward the radially inner side. As shown in FIG. 8, as viewed from the axial direction, the edge (peripheral wall) of each of the grooves 57 includes a straight wall 57*a* extending substantially straight in the radial direction at a position separated from the recess 51*b* and the caulking portion 55 in the circumferential direction, a semicircular wall 57*b* connected to a radially outer side end of the straight wall 57*a* and extending to the radially outer side in a manner of folding back in a substantially semicircular shape, and a quadrant wall 57*c* connected to a radially inner side end of the semicircular wall 57*b* on the side close to the recess 51*b* and the caulking portion 55 and extending to the radially inner side in a manner of folding back in a substantially quadrant shape. The quadrant walls 57*c* and 57*c* of the pair of grooves 57 and 57 are connected to each other directly below the radially inner side of the recess 51*b* and the caulking portion 55.

As shown in FIGS. 8 and 10, the thin wall 59 is provided between the recess 51*b* and the pair of grooves 57 and 57. The thin wall 59 in the illustrated embodiment is provided between the recess 51*b* and the quadrant walls 57*c* and 57*c* of the pair of grooves 57. The caulking portion 55 is obtained by plastically deforming a portion 59*a* of the thin wall 59 on the radially inner side toward the radially outer side using a tool such as a punch. The caulking portion 55 prevents the bolt 60 from falling off even when the bolt 60 is loosened.

Note that in the embodiment of FIG. 8, the caulking portion 55 is obtained by plastically deforming the portion 59*a* of the thin wall 59 on the radially inner side toward the radially outer side, but is not limited thereto, and the caulking portion 55 may be obtained by plastically deforming portions 59*b* and 59*b* of the thin wall 59 on both sides in the circumferential direction toward an inner side in the circumferential direction, which is a side of the head 61 of the bolt 60.

The groove 57 may not necessarily be provided in a pair at positions separated from the recess 51*b* on both sides of the recess 51*b* in the circumferential direction, and may at least be provided at a position separated from the recess 51*b* on at least one of both sides of the recess 51*b* in the circumferential direction.

First Modification of Second Embodiment

Figure 11:
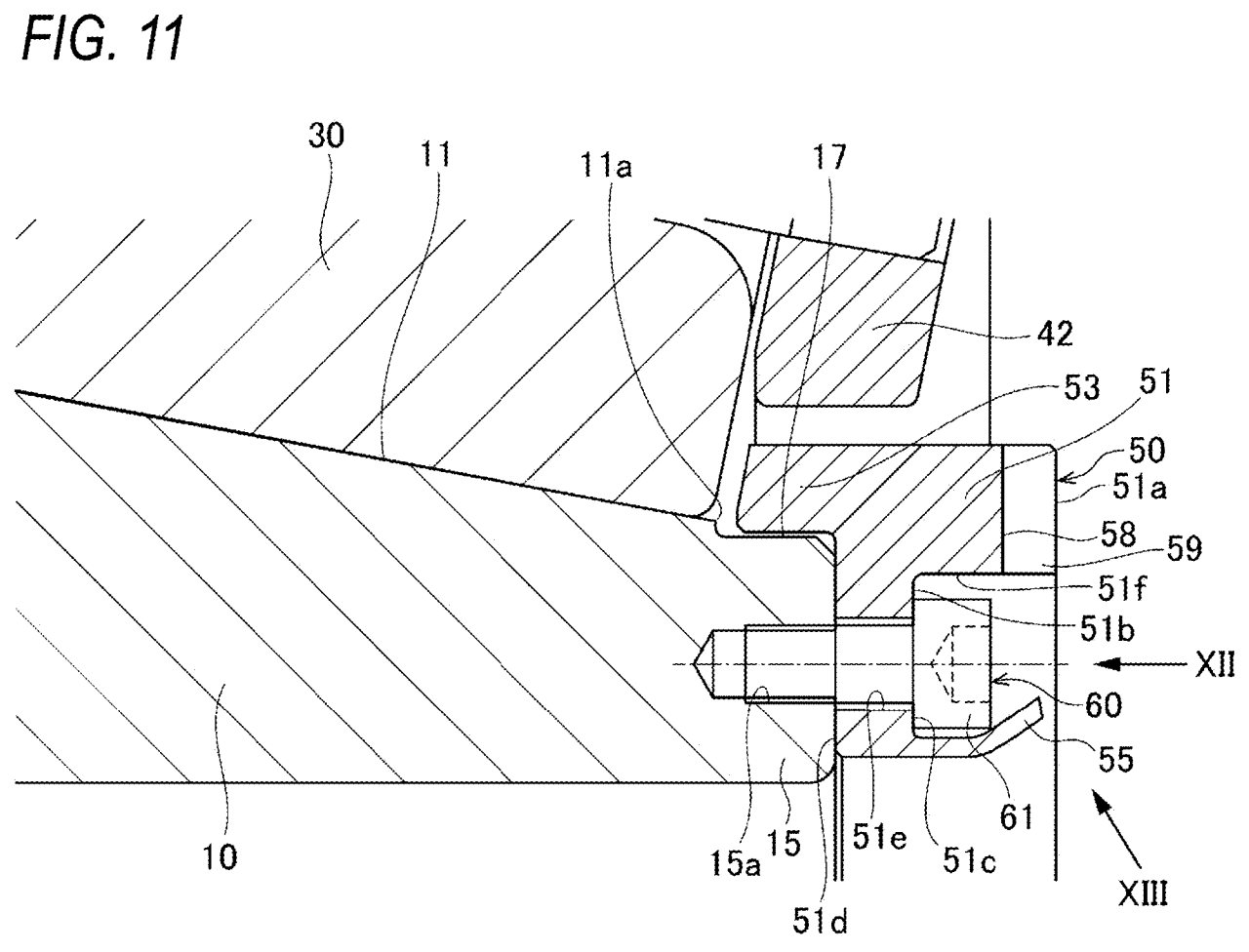
Figure 12:
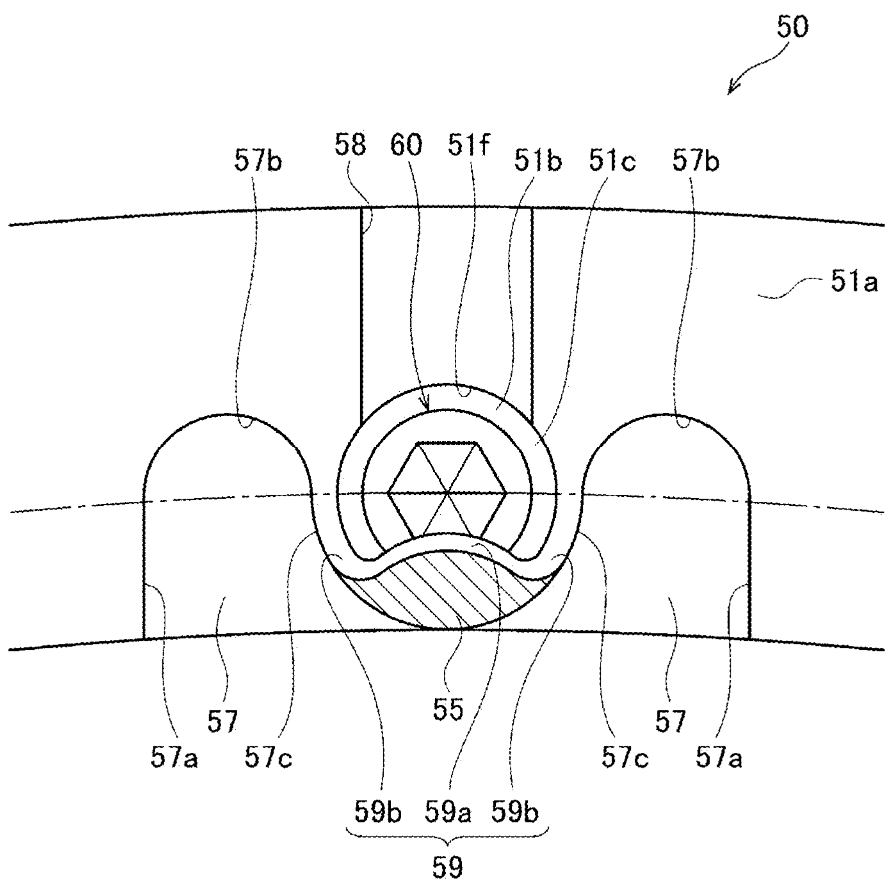
FIG. 12 is a view of a flange member in FIG. 11 as viewed in a direction of an arrow XII.
Figure 13:
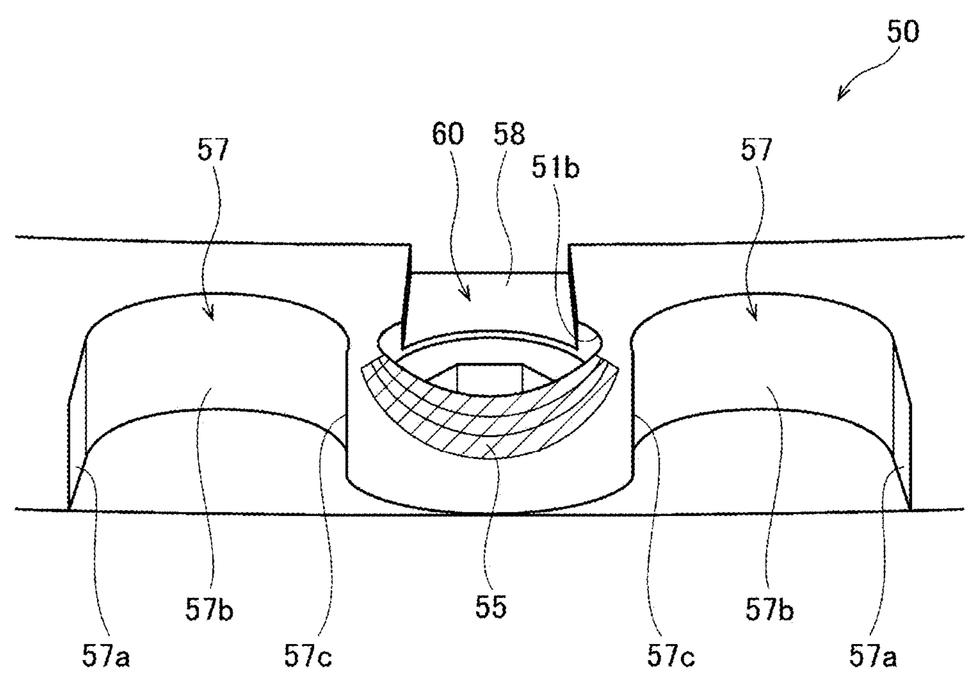
FIG. 13 is a view of the flange member in FIG. 11 as viewed in a direction of an arrow XIII.

FIG. 11 is a sectional view of a main part of the conical roller bearing 1 according to a first modification of the second embodiment. FIG. 12 is a view of the flange member 50 in FIG. 11 as viewed in a direction of an arrow XII. FIG. 13 is a view of the flange member 50 in FIG. 11 as viewed in a direction of an arrow XIII.

As shown in FIGS. 11 to 13, in the present modification, the through groove 58 that penetrates the base 51 in the radial direction is formed in a portion of the base 51 of the flange member 50 that faces a tip (the other end in the axial direction, the right end in FIG. 11) of the caulking portion 55 in the radial direction. The through groove 58 is used to release the caulking of the caulking portion 55 when the bolt 60 is removed during maintenance or the like. That is, when the caulking of the caulking portion 55 is released, a tool such as a punch is inserted from the radially outer side of the base 51 via the through groove 58, and the caulking portion 55 is plastically deformed toward the radially inner side. The bolt 60 released from pressing by the caulking portion 55 becomes detachable. According to such a configuration, maintainability of the conical roller bearing 1 can be improved.

Second Modification of Second Embodiment

Figure 14:
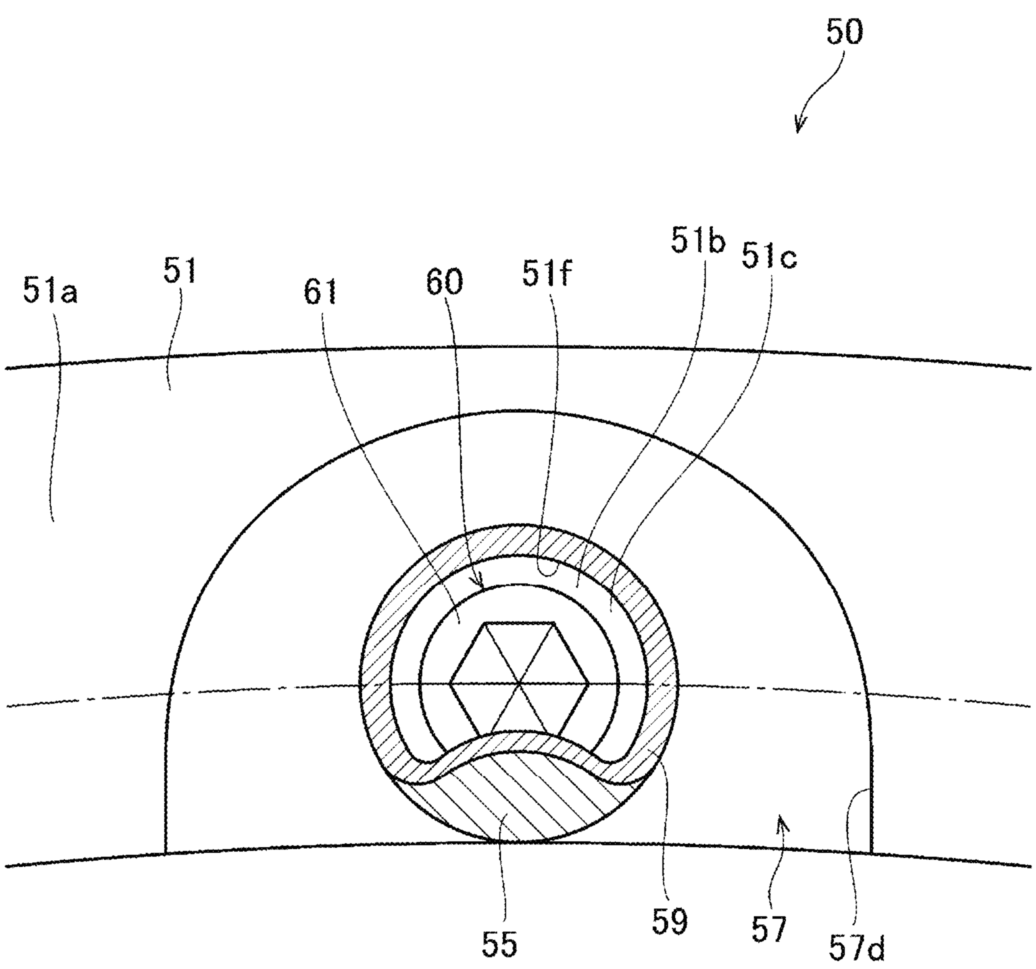
FIG. 14 is a view of a main part of a flange member according to a second modification of the second embodiment as viewed from the other side in the axial direction.

FIG. 14 is a view of a main part of the flange member 50 according to a second modification of the second embodiment as viewed from the other side in the axial direction. The flange member 50 of the present modification is different from the flange member 50 of the second embodiment (see FIG. 8) in that the caulking portion 55 is formed on the whole circumference of the edge 51*f* of the recess 51*b*.

As shown in FIG. 14, the flange member 50 includes the caulking portion 55 that presses the head 61 of the bolt 60 from the other end side in the axial direction. In FIG. 14, the caulking portion 55 is indicated by a hatched region. The caulking portion 55 extends from the whole circumference of the edge 51*f* of the recess 51*b* toward the center of the head 61 of the bolt 60 and overlaps the head 61. The caulking portion 55 presses the whole circumference of the head 61 of the bolt 60 from the other end side in the axial direction. The caulking portion 55 is formed by plastically deforming the thin wall 59 between the whole circumference of the edge 51*f* of the recess 51*b* and the groove 57 formed around the edge 51*f* using a tool such as a punch.

The base 51 of the flange member 50 is formed with a groove 57 recessed from the other end surface 51*a* in the axial direction toward one side in the axial direction on a side opposite to the head 61 of the bolt 60 and the recess 51*b* with the caulking portion 55 interposed therebetween. The groove 57 opens to the radially inner side. As shown in FIG. 14, when viewed from the axial direction, an edge 57*d* (peripheral wall) of the groove 57 has a substantially semi-circular shape.

The groove 57 is formed to have dimensions in the circumferential direction and the radial direction larger than those of the head 61 of the bolt 60 and the recess 51*b* of the base 51. Accordingly, as shown in FIG. 14, when viewed from the axial direction, the head 61 of the bolt 60 and the recess 51*b* of the base 51 are disposed inside the groove 57. The thin wall 59 is formed between the groove 57 and the whole circumference of the edge 51*f* of the recess 51*b*.

The thin wall 59 is plastically deformed toward the head 61 of the bolt 60 by a tool such as a punch, thereby obtaining the caulking portion 55. The caulking portion 55 prevents the bolt 60 from falling off even when the bolt 60 is loosened. Especially, in the present modification, the caulking portion 55 extends from the whole circumference of the edge 51*f* of the recess 51*b* and extends so as to overlap the whole circumference of the head 61 of the bolt 60, and therefore the effect of preventing the bolt 60 from falling off is excellent.

Note that the present invention is not limited to the above-described embodiment, and various modifications can be made. For example, the present invention can be applied to a roller bearing such as a cylindrical roller bearing other than the conical roller bearing.

For example, in the above-described embodiment, the inner ring boss 15 protruding from the inner ring raceway surface 11 toward the other end side in the axial direction is formed at the other end of the inner ring 10 in the axial direction, but the inner ring boss 15 may not be provided. When the inner ring boss 15 is not formed, the flange member 50 is disposed at the other end of the inner ring 10 in the axial direction (at a position adjacent to the other end 11*a* of the inner ring raceway surface 11 in the axial direction) as in Patent Literature 1 (JP2014-190352A). In this case, since the inner ring boss 15 is not formed, the inner ring 10 does not have the stepped portion 17, and the flange member 50 does not have the projection 53. The threaded hole 15*a* is formed from the other end surface of the inner ring 10 in the axial direction toward one end side in the axial direction.

In the above-described embodiment, the flange member 50 is recessed from the other end surface 51*a* of the base 51 in the axial direction toward one side in the axial direction, and has the recess 51*b* on which the head 61 of the bolt 60 is seated, but the recess 51*b* may not be formed in the flange member 50. In this case, the through hole 51*e* is formed to penetrate from the other end surface 51*a* of the base 51 in the axial direction to one end surface 51*d* in the axial direction, and the head 61 of the bolt 60 is seated on the other end surface 51*a* of the base 51 in the axial direction. Also in this case, the caulking portion 55 that presses the head 61 of the bolt 60 from the other end side in the axial direction is formed in the flange member 50, and the groove 57 extending from the other end surface 51*a* of the base 51 in the axial direction toward one side in the axial direction is provided in the base 51 of the flange member 50 on a side opposite to the head 61 of the bolt 60 with the caulking portion 55 interposed therebetween.

As described above, the following matters are disclosed in the present specification.

(1) A roller bearing, including:

an inner ring including an outer peripheral surface having an inner ring raceway surface;

an outer ring including an inner peripheral surface having an outer ring raceway surface; and a plurality of rollers disposed such that the rollers are capable of rolling between the inner ring raceway surface and the outer ring raceway surface, in which a flange integrated with the inner ring is formed at one end of the inner ring in an axial direction, a flange member separate from the inner ring is fastened to a fastening member extending in the axial direction at the other end of the inner ring in the axial direction, and the flange member includes a base abutting against the inner ring in the axial direction and on which a head of the fastening member is seated, and a caulking portion pressing the head of the fastening member from the other end side in the axial direction.

(2) The roller bearing according to (1), in which the flange member includes a recess recessed from the other end surface of the base in the axial direction toward one side in the axial direction and on which the head of the fastening member is seated, and the base of the flange member includes a groove recessed from the other end surface of the base in the axial direction toward one side in the axial direction at a position separated from the recess and on a radially outer side of the recess.

(3) The roller bearing according to (1), in which the flange member includes a recess recessed from the other end surface of the base in the axial direction toward one side in the axial direction and on which the head of the fastening member is seated, and the base of the flange member includes a groove recessed from the other end surface of the base in the axial direction toward one side in the axial direction at a position separated from the recess and on at least one of both sides of the recess in a circumferential direction.

(4) The roller bearing according to any one of (1) to (3), in which the base of the flange member is provided with a groove on a side opposite to the head of the fastening member with the caulking portion interposed therebetween, and recessed from the other end surface of the base in the axial direction toward one side in the axial direction.

(5) The roller bearing according to any one of (1) to (4), in which the flange member includes a recess recessed from the other end surface of the base in the axial direction toward one side in the axial direction and on which the head of the fastening member is seated, and the caulking portion extends from at least a part of an edge of the recess and extends so as to overlap the head of the fastening member.

(6) The roller bearing according to (5), in which the caulking portion extends from a whole circumference of the edge of the recess and extends so as to overlap a whole circumference of the head of the fastening member.

(7) The roller bearing according to any one of (1) to (6), in which the other end of the inner ring in the axial direction is formed with an inner ring boss protruding from the inner ring raceway surface toward the other end side in the axial direction, the flange member is fastened to the inner ring boss by the fastening member, and the fastening member does not overlap the inner ring raceway surface in the axial direction.

Although various embodiments have been described above, it goes without saying that the present invention is not limited to such embodiments. It is apparent for those skilled in the art to which the present invention belongs that various modified examples or corrected examples are conceivable within the scope recited in the claims, and it is understood that the above falls within the technical scope of the present invention. In addition, within the scope not departing from the gist of the invention, each of the configuration elements in the above embodiments may be combined in any manner.

REFERENCE SIGNS LIST

1 conical roller bearing (roller bearing)
10 inner ring
11 inner ring raceway surface
11*a* the other end in the axial direction
13 flange
15 inner ring boss
15*a* threaded hole
17 stepped portion
20 outer ring
21 outer ring raceway surface
30 conical roller (roller)
40 cage
41, 42 annular portion
43 pin
50 flange member
51 base
51*a* the other end surface in the axial direction
51*b* recess
51*c* bottom surface
51*d* one end surface in the axial direction
51*e* through hole
51*f* edge
53 projection
55 caulking portion
57 groove
57*a* straight wall
57*b* semicircular wall
57*c* quadrant wall
57*d* edge
58 through groove
59 thin wall
59*a* portion on the radially inner side
59*b* both sides in the circumferential direction
60 bolt (fastening member)
61 head
A, B virtual plane

The invention claimed is:

1. A roller bearing, comprising:

an inner ring including an outer peripheral surface having an inner ring raceway surface;

an outer ring including an inner peripheral surface having an outer ring raceway surface; and a plurality of rollers disposed such that the rollers are capable of rolling between the inner ring raceway surface and the outer ring raceway surface, wherein:

a flange integrated with the inner ring is formed at one end side of the inner ring in an axial direction;

a flange member separate from the inner ring is fastened by a fastening member extending in the axial direction at an other end side of the inner ring in the axial direction; and the flange member includes:

a base abutting against the inner ring in the axial direction and on which a head of the fastening member is seated;

a caulking portion extending from a radially inner side portion to a radially outer side portion and pressing the head of the fastening member from the other end side in the axial direction; and a through groove formed in a portion of the base that faces a tip of the caulking portion in the radial direction, and penetrating the base in the radial direction.

2. The roller bearing according to claim 1, wherein:

the flange member includes a recess recessed from the other end surface of the base in the axial direction toward one side in the axial direction and on which the head of the fastening member is seated; and the base of the flange member includes a groove recessed from the other end surface of the base in the axial direction toward one side in the axial direction at a position separated from the recess and circumferentially offset from the recess, as viewed in the axial direction.

3. The roller bearing according to claim 1, wherein:

the flange member includes a recess recessed from the other end surface of the base in the axial direction toward one side in the axial direction and on which the head of the fastening member is seated; and the caulking portion extends from at least a part of an edge of the recess and extends so as to overlap the head of the fastening member.

4. The roller bearing according to claim 1, wherein:

the other end of the inner ring in the axial direction is formed with an inner ring boss protruding from the inner ring raceway surface toward the other end side in the axial direction;

the flange member is fastened to the inner ring boss by the fastening member; and the fastening member does not overlap the inner ring raceway surface in the axial direction.

* * * * *